L. DEMING.
Horse-Collar Attachment.

No. 198,191. Patented Dec. 18, 1877.

ATTEST,
Saml. S. Boyd
Paul Bakewell

INVENTOR.
Lucius Deming
by Chas. D. Moody,
his atty.

UNITED STATES PATENT OFFICE.

LUCIUS DEMING, OF ST. LOUIS, MISSOURI, ASSIGNOR OF ONE-HALF HIS RIGHT TO COTTON H. ALLEN, OF SAME PLACE.

IMPROVEMENT IN HORSE-COLLAR ATTACHMENTS.

Specification forming part of Letters Patent No. 198,191, dated December 18, 1877; application filed November 6, 1877.

*To all whom it may concern:*

Be it known that I, LUCIUS DEMING, a resident of St. Louis, Missouri, have invented a new and useful Anti-Galling Attachment for Horse-Collars, of which the following is a full, clear, and exact description, reference being had to the annexed drawing, making part of this specification, in which—

Figure 1:
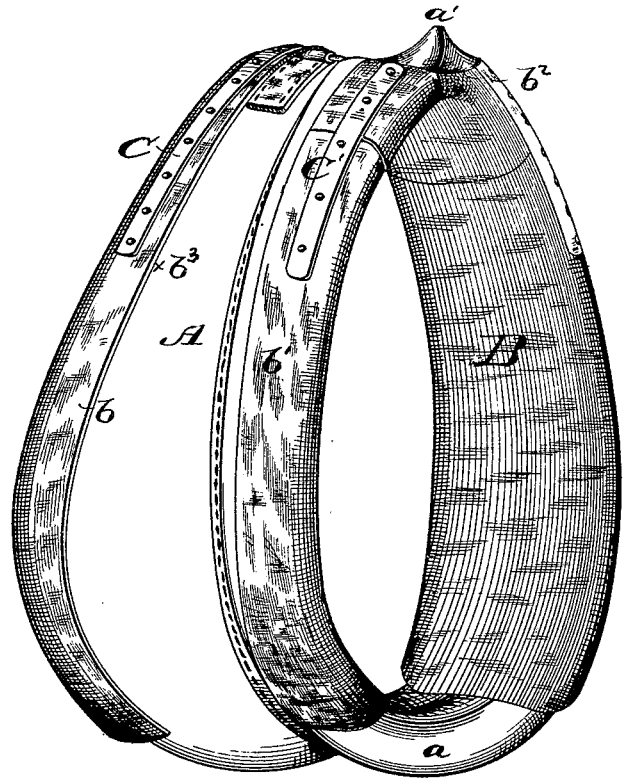
Figure 2:
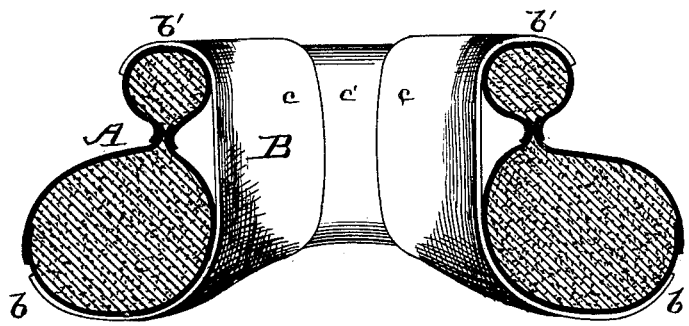

Figure 1 is a perspective view, showing the invention in position; and Fig. 2, a cross-section of the collar and attachment.

Similar letters refer to similar parts.

By means of the present invention a horse-collar is effectually prevented from galling the neck of the horse. It consists, substantially, of a piece of leather or other suitable material, that is interposed between the collar and the animal's neck, and is shaped so as to be suspended from the collar, but in such manner as to be independent of the movement of the latter, and to remain stationary upon the neck.

Referring to the annexed drawing, A represents an ordinary horse-collar. B represents the attachment. It consists, preferably, of a piece of leather, and extends entirely around the inside of the collar, saving at the throat $a$, and is provided with two crimps—one, $b$, that comes up over the afterwale or pad of the collar, and the other, $b^1$, that comes over the forewale or rib of the collar. The collar and attachment are not fastened to each other; but, by reason of the crimps $b\ b^1$, the attachment is supported in position. As the collar moves in use, it slides upon the attachment, while the latter remains in the same position upon the horse's neck. The neck is thus shielded from the wear of the collar. The attachment is readily attached to, and removed from, the collar by springing the crimps back. The crimp $b^1$ is preferably cut away at $b^2$, to provide for the projecting peak $a'$, and also to facilitate the turning back of the crimp. To sustain the crimps properly in place when wet I preferably re-enforce them at C C', respectively.

The crimps $b\ b^1$ need not extend, in all cases, as far up and down upon the collar as is shown in the drawing. The lower portion of the crimp $b$—say from the point $b^3$ downward—may be omitted, and that part of the attachment may be allowed to flare from the collar. The attachment is preferably made in three pieces, $c\ c\ c'$, the latter being in the neck of the collar.

I claim—

1. As an improved manufacture, the flexible crimped attachment B for horse-collars.

2. The combination of the collar A and the flexible crimped attachment B, substantially as described.

3. The combination of the collar A and the flexible crimped attachment B, provided with re-enforces C C', substantially as described.

LUCIUS DEMING.

Witnesses:
CHAS. D. MOODY,
PAUL BAKEWELL.